United States Patent [19]
Trabold

[11] Patent Number: 5,556,543
[45] Date of Patent: Sep. 17, 1996

[54] FILTER FOR FILTERING GASEOUS AND LIQUID MEDIA

[76] Inventor: Hermann Trabold, Richolfstrasse 64, D-6980 Wertheim, Germany

[21] Appl. No.: 266,801

[22] Filed: Jun. 22, 1994

Related U.S. Application Data

[63] Continuation of Ser. No. 859,296, filed as PCT/DE91/00755, Sep. 24, 1991, abandoned.

[30] Foreign Application Priority Data

Sep. 25, 1990 [DE] Germany .......................... 40 30 304.7

[51] Int. Cl.⁶ .................................................. B01D 27/06
[52] U.S. Cl. ........................ 210/435; 210/440; 210/451; 210/457; 210/483; 210/497.1; 210/437
[58] Field of Search ...................... 210/317, 437, 210/438, 439, 446, 451, 457, 483, 485, 488, 493.1, 493.2, 493.4, 496, 497.01, 497.1, 435; 55/497

[56] References Cited

U.S. PATENT DOCUMENTS

| | | | |
|---|---|---|---|
| 1,632,461 | 6/1927 | Burhans | 210/304 |
| 1,737,313 | 11/1929 | Kamrath | 210/451 |
| 1,910,747 | 5/1933 | Burhans | 210/451 |
| 1,930,209 | 10/1933 | Milkey | 210/455 |
| 1,981,307 | 11/1934 | Burhans | 210/451 |
| 2,098,725 | 11/1937 | Hurn | 210/317 |
| 2,349,174 | 5/1944 | Klinkhamer | 210/438 |
| 3,216,578 | 11/1965 | Wright | 210/488 |
| 3,279,615 | 10/1966 | Stokes | 210/488 |
| 4,048,071 | 9/1977 | Yamada et al. | 210/488 |

FOREIGN PATENT DOCUMENTS

847515  7/1951  Germany .................. 210/457

Primary Examiner—Matthew O. Savage
Attorney, Agent, or Firm—Davis, Bujold & Streck, P.A.

[57] ABSTRACT

The invention relates to a filter (1) for filtering gaseous and liquid media, in particular an oil filter for internal combustion engines, having a filter housing (2) and a filter packing (8) taken up in the filter housing and made of a porous deformable material, e.g. a roll of absorbent paper. To prevent the filter packing from being deformed and thereby preventing a smooth flow through the filter packing, stabilizing elements (12), e.g. stabilizing bars, are provided for fixing the form and position of the filter packing (8) in the filter housing.

14 Claims, 6 Drawing Sheets

FILTER FOR FILTERING GASEOUS AND LIQUID MEDIA

This is a continuation of application Ser. No. 07/859,296, filed as PCT/DE91/00755, on Sep. 24, 1991, now abandoned.

The present invention relates to a filter for filtering gaseous and liquid media, in particular an oil filter for internal combustion engines, according to the preamble of claim 1.

German patent no. 1 051 062 discloses such a filter wherein the filter packing is a roll of absorbent paper slipped onto a central core. The known filter can be used e.g. as an oil filter for internal combustion engines. Such oil filters work as fine filters and can be disposed e.g. in a side stream of the oil flow, i.e. used in addition to an oil filter already present. Due to this fine filtering the oil virtually does not need to be replaced; one only needs to refill the amount actually used up. In any case this substantially increases the operating times.

In the known filter the liquid flows through the paper filter packing in countercurrent between the inlet and outlet, Other functional principles are also known, e.g. radial flow according to German patent no. 24 60 073, or cocurrent flow e.g. for a gasoline filter according to German "offenlegungsschrift" no. 36 17 420, where the fuel flows axially through the wound filter packing.

German "offenlegungsschrift" no. 38 42 017 also discloses an oil filter of modular construction, permitting an oil filter to be assembled with several filter packings and the volume of the filter packing to be readily adapted to the total amount of oil to be circulated.

A problem with such filters wherein the filter packings are constructed from absorbent paper, either as a roll or in individual layers, or from a different porous spongelike but deformable material is that the filter packing must withstand the pressure of the liquid flowing through it. Particularly when a more viscous liquid, e.g. lubricating oil, is involved and part of the filter packing is already clogged by filtered-out dirt, the flow resistance is so great that the pores of the filter material are pressed together to the point of impermeability. With filter packings made of absorbent paper rolls the filter packings can be compressed up to 30% and more. This deformation limits the service life of such filter packings. With conventional oil filters for the internal combustion engines of motor vehicles, for example, it is recommended to change the filter packings every 5,000 to 10,000 kilometers of driving distance.

Such filter packings could in principle also be used for filtering gaseous media, e.g. for filtering air. Here, too, however, the same problems would occur as described above, so that the air filters would clog prematurely.

The invention is based on the problem of modifying these filters in such a way as to keep the flow resistance throughout the service life always at a level that ensures a smooth flow of the medium with a high filter effect and thus prolongs the service life.

The idea of the invention accordingly consists in keeping the porous and deformable filter packing dimensionally stable during operation and also fixing its position in the filter housing by stabilizing elements. Such stabilizing elements considerably neutralize the pressing power of the liquid on the filter packing since they cause the filter packing to be substantially only under tension and not under pressure, as happens with conventional filters of the type in question. The stabilizing elements are each situated at least in the area of the entry surface of the liquid and are e.g. bars disposed perpendicular to the direction of flow. These bars penetrate all paper layers, if the filter packing is a roll of paper or an assembly of a multiplicity of paper layers. These paper layers are not compressed again by the fixation of the filter packing in the filter housing.

To permit optimum utilization of filter packings, e.g. the abovementioned rolls of paper, it is advantageous to filter the liquid radially and axially. One can apply the cocurrent principle or the countercurrent principle.

Using a filter according to the invention as an oil filter for the internal combustion engines of motor vehicles one obtains a normal service life of 20,000 kilometers of driving distance. The filter packings need to be replaced only half as often in comparison with conventional oil filters. Regardless of the medium to be filtered, the service life is thus substantially prolonged over conventional constructions.

Further embodiments of the invention are found in the subclaims.

The invention shall be explained in more detail in several embodiment examples with reference to the drawing, in which.

Figure 1:
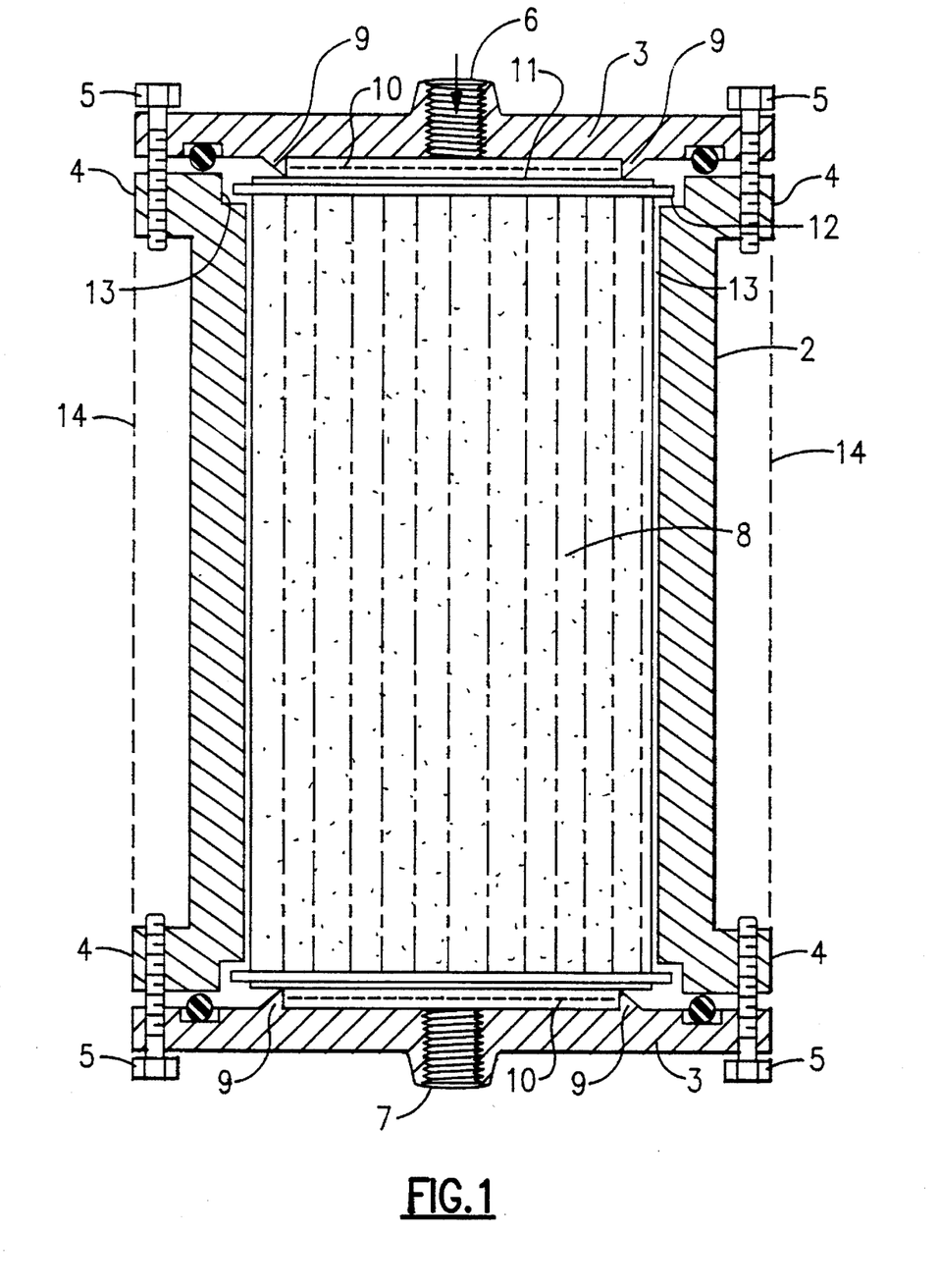
FIG. 1 shows a longitudinal section through a filter according to the invention having a filter housing and a filter packing disposed therein which is stabilized in its form and position.

FIG. 1 shows an oil filter 1 having a tubular filter housing 2 and a cover 3 on each side of this filter housing. Filter housing 2 and covers 3 are connected by flanges 4 to the housing and by screws 5 with each other. An inlet 6 is provided in the center of upper cover 3 in FIG. 1, and an outlet 7 in the center of the lower cover. The filter housing contains a filter packing 8 wound out of absorbent paper. To hold filter packing 8 a peripheral bezel 9 is provided near the edge of each cover, engaging with its tip between the layers of the absorbent paper of the filter packing. In addition, the bottom of the cover is filled in with a fairly stable wire netting 10 within peripheral bezel 9 for additionally supporting the filter packing.

For filtering oil, the dirty oil flows via inlet 6 into the filter, is distributed by wire netting 10, passes on the top, i.e. entry surface 11, into filter packing 8, flows longitudinally through filter packing 8 and via outlet 7 out of the oil filter, as indicated by the arrows in FIG. 1.

To prevent filter packing 8 from being compressed by the oil flowing into the filter at relatively high pressure, a stabilizing bar 12 is provided in the upper area of the filter packing facing inlet 6, said bar reaching through a transverse bore through all layers of the filter packing and protruding beyond the filter packing at both outer edges thereof. The protruding ends of stabilizing bar 12 are supported on a stop or the bottom of a groove 13 on filter housing 2. When oil flows into the oil filter, the filter packing is fixed in its position in the filter housing by the stabilizing bar so that the oil flowing through the filter packing puts the filter packing substantially only under tension. This prevents clogging of the pores of the filter packing and thus a compression of the total filter packing.

Figure 2:
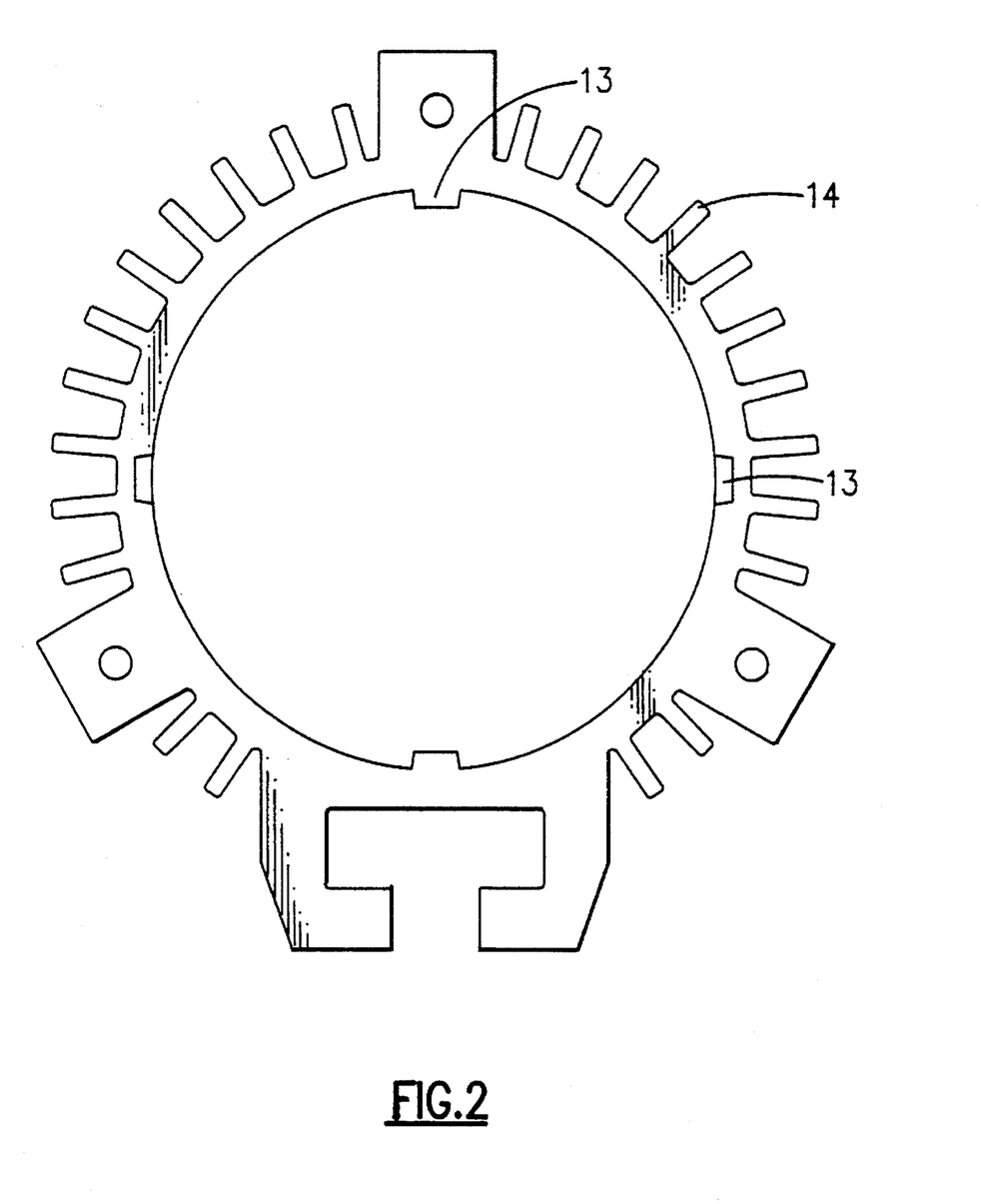
FIG. 2 shows a top view of the open filter housing of he filter according to FIG. 1 with the filter packing taken out.

FIG. 2 shows stops or grooves 13 more clearly. This figure also indicates that the filter housing has cooling ribs 14.

Figure 3:
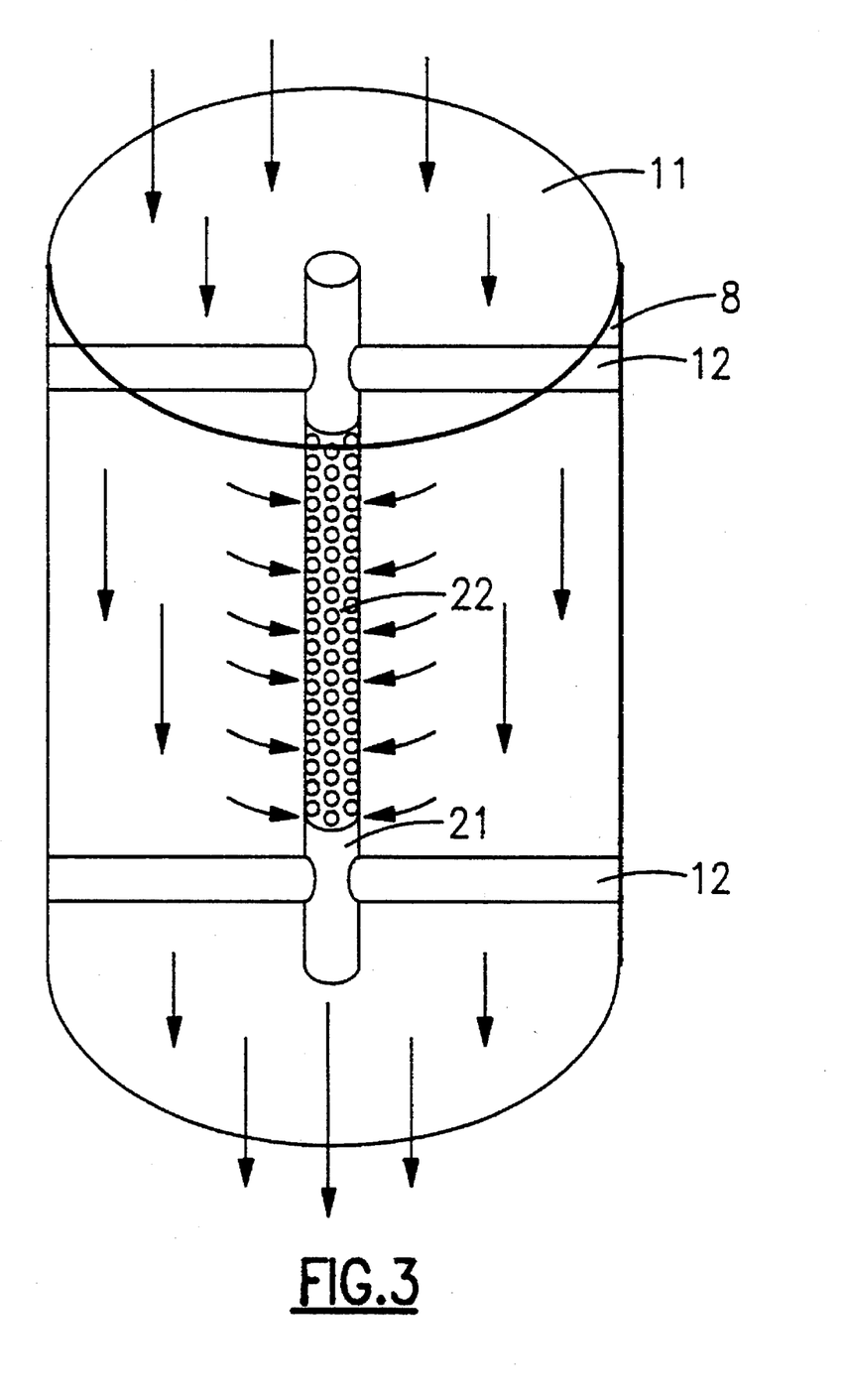
FIGS. 3 to 7 show schematic representations of different embodiments of a cylindrical filter packing according to the invention.

FIG. 3 likewise shows a filter packing 8 wound out of a paper strip, whereby this filter packing has a central core 21 penetrating the entire length of the filter packing. Core 21 is a tube having a plurality of openings 22 within the filter packing over the greatest length thereof. Core 21 is blocked for the oil to be filtered on the top, here entry surface 11 again, but open at the bottom of the filter packing. A stabilizing bar 12 penetrating the filter packing is connected with core 21, again perpendicular to the direction of flow on entry surface 11, and a further stabilizing bar is provided on the lower end of the core. In this embodiment it is hoe necessary for the stabilizing bars to protrude beyond the filter packing and lie against corresponding stops in the filter housing, since core 21 fixes stabilizing bars 12 here.

If filter packing 8 shown in FIG. 3 is used in a filter according to FIG. 1, the oil to be filtered flows over entry surface 11 longitudinally through the filter, but a certain proportion also flows radially toward core 21, enters it through openings 22 and leaves at the lower end of the core. The flow can thus be termed axial/radial.

Figure 4:
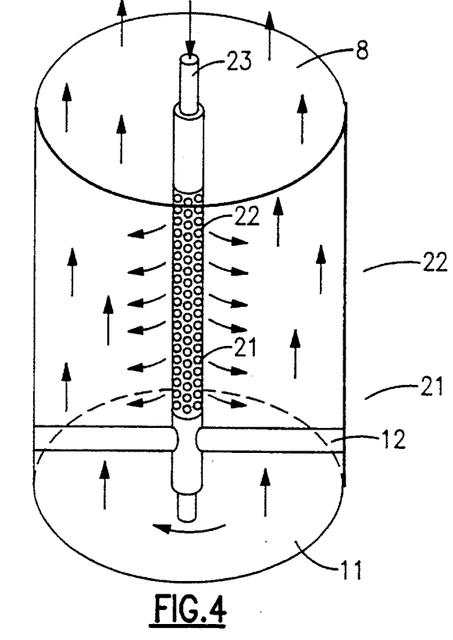

Cylindrical filter packing 8 shown in FIG. 4, made of a roll of absorbent paper, again has a central hollow core 21 which is closed on entry surface 11, the bottom in this case. The hollow core again has openings 22 over part of its length within the filter packing; a standpipe 23 of the filter housing also leads through the hollow core. This standpipe serves, among other things, to hold the filter packing in the center of the filter housing. It can also be used to feed oil to the filter packing, the oil then flowing radially out of the hollow core into filter packing 8. The dirty oil also passes out of standpipe 23 at the bottom of the filter packing, is distributed there e.g. via a wire netting in accordance with FIG. 1, passes into the filter packing on the underside thereof, which is entry surface 11, flows through the packing in the longitudinal direction from bottom to top, and leaves the filter housing on the top of the filter packing. In such an embodiment both the inlet and the outlet are accordingly provided in the upper cover of the filter. A stabilizing bar 12 is likewise connected with the core in the area of the entry surface, this bar protruding beyond the outer edge of the filter packing and being fixed on corresponding stops 13 in the filter housing, as shown in FIGS. 1 and 2.

Figure 5:
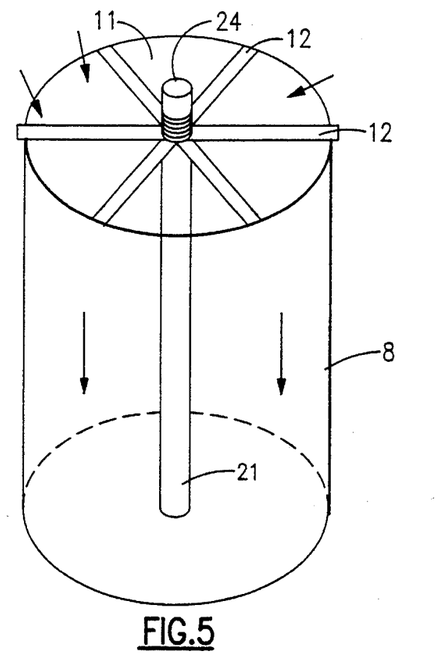

FIG. 5 again shows a cylindrical filter packing with a core 21. At the upper end of this core there is a star-shaped pattern of several thin flat stabilizing bars 12, these bars 12 being connected, e.g. glued or clamped, to the top of the filter packing, i.e. entry surface 11, for the oil to be filtered. With these stabilizing bars a plug attachment 24 or a thread can also be provided coaxially to core 21 for fastening the filter packing to the housing bottom or a cover of the oil filter. As shown in FIG. 5, at least one stabilizing bar can also protrude beyond the outer edge of the filter packing to fix filter packing additionally in its position in the filter housing.

FIG. 6 again shows a cylindrical filter packing 8, but the top and underside have been made impermeable to the liquid to be filtered by corresponding treatment, e.g. by application of an adhesive or the like, which is indicated by the hatching in the Figure. Entry surface 11 for the liquid to be filtered is accordingly the total peripheral surface of filter packing 8. This filter packing 8 again has a hollow core 21 with openings 22. The hollow core is open at one end, in this case the upper end, and closed at the other end. At both ends of the hollow core there are stabilizing bars 12 again extending perpendicular thereto, which are fixed in their position by core 21; an additional fixation in the filter housing is unnecessary.

Figure 6:
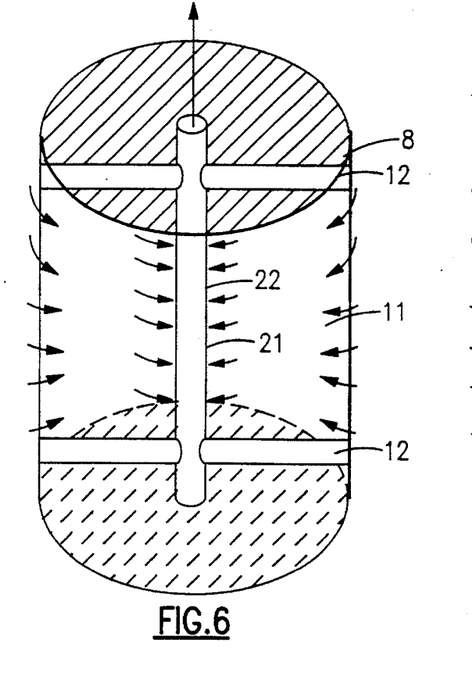

As indicated in FIG. 6, the liquid to be filtered flows from the outside to the inside into the core and out of the latter. This filter packing is thus a strictly radial filter element. This construction guarantees the intended filtering path since the filter housing not shown here need not seal any surfaces, The filter element is simply slipped or screwed onto the housing.

Figure 7:
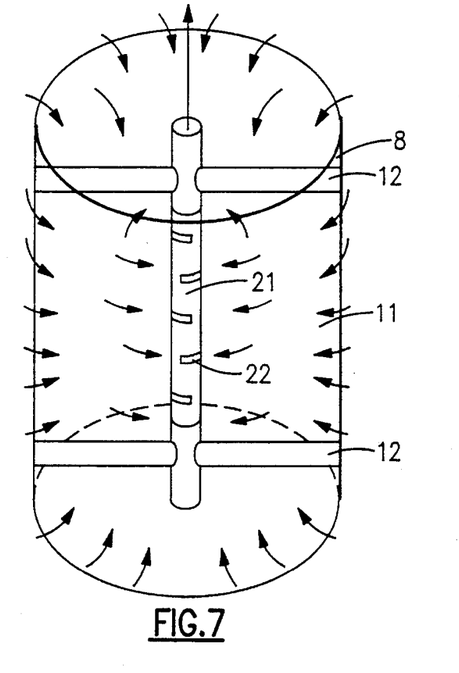

FIG. 7 shows a cylindrical filter packing 8 with a hollow core 21 which again has openings 22 and is open on the top. At both ends of the hollow core there are again transverse stabilizing bars 12 which in this case protrude beyond the filter packing and can thus be held additionally on stops in the filter housing, This construction offers the greatest useful filter surface if the roll is massive.

Figure 8:
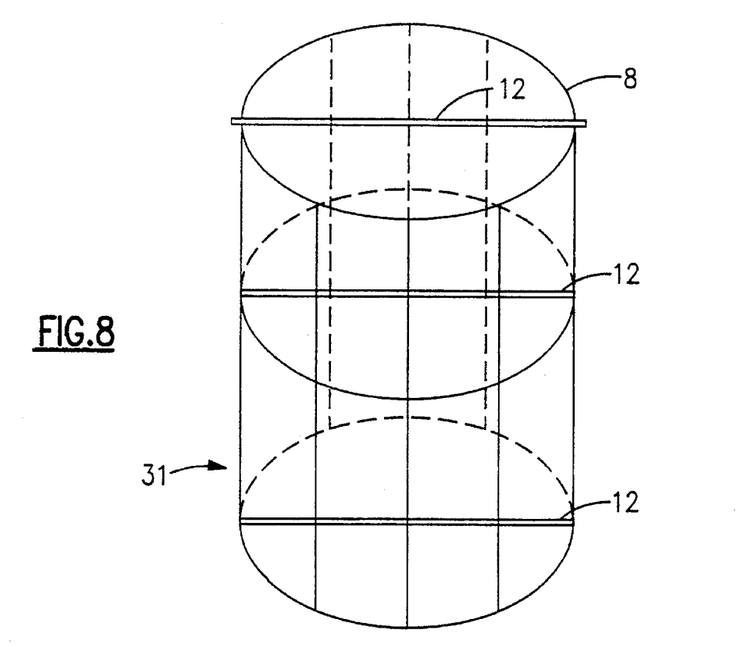
FIG. 8 shows a schematic representation of a support basket for a filter packing to be made of plastic foam.

FIG. 8 shows a support basket 31 for a filter packing to be foamed of plastic. The support basket is made e.g. of metal, with transverse stabilizing bars 12 additionally provided. The support basket is filled in with an open-pore plastic foam, e.g. polyurethane or polystyrene foam. Deformation of filter packing 8 during filtering is prevented by support basket 31 with stabilizing bars 12. Also, stabilizing bars 12 can protrude beyond the filter packing, as shown for the upper bar, and hit corresponding stops in the filter housing.

Figure 9:
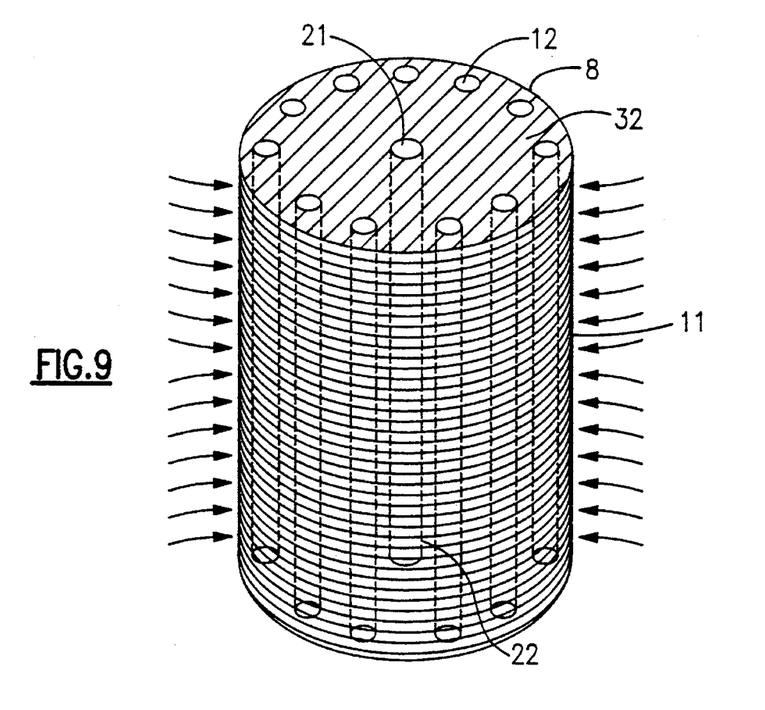
FIG. 9 shows a schematic representation of a cylindrical filter packing.

FIG. 9 shows a cylindrical filter packing 8 with a hollow core 21. The top and underside of this filter packing are again impermeable to the medium to be filtered, e.g. provided with a coating 32 indicated here by hatching. Hollow core 21 has several openings 22 over approximately its total length within the filter packing, so that the oil flowing from the peripheral surface, i.e. entry surface 11, into the filter packing passes into core 21 and flows out of the upper opening of the core, as indicated by the arrows. This filter packing is thus again a radial filter element, on which the liquid to be filtered flows along the layers to the middle.

To fix the form and position of filter packing 8 even at high pressures, stabilizing bars 12 are provided in the longitudinal direction along the periphery of filter packing 8 and penetrating the latter, whereby at least some of the stabilizing bars can also protrude out of the top or underside of the filter packing and be fixed on corresponding stops in the filter housing.

Figure 10:
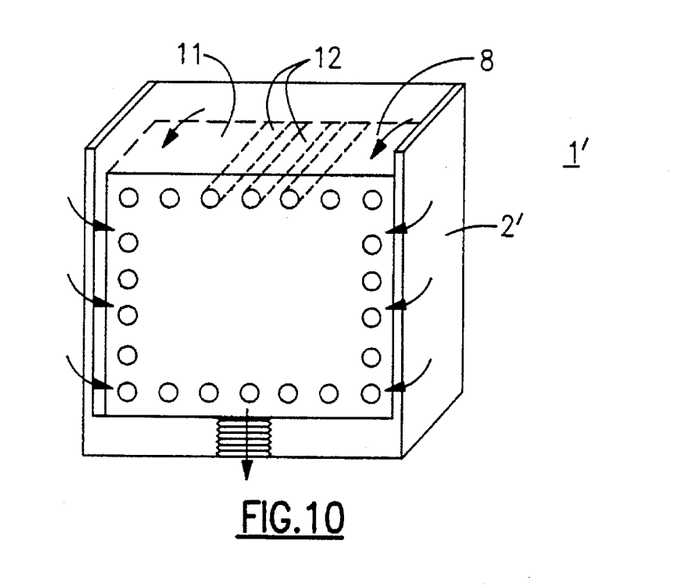
FIG. 10 shows a schematic representation of a cuboid sheet filter.

FIG. 10 shows a sheet filter 1'. This sheet filter has a rectangular filter housing 2' to be closed by a cover not shown here and taking up the inlet. Filter housing 2' contains a cuboid filter packing 8' consisting of a multiplicity of layers of absorbent paper. All layers are penetrated at least on upper entry side 11 by transverse stabilizing bars 12 lying against stops (not shown here) within the filter housing. The stabilizing bars are disposed here along the total periphery of filter packing 8'. It is conceivable to provide stabilizing bars 12 only on the top of filter packing 8' if oil virtually does not flow from the outer sides into the filter packing. If this is the case, as indicated by the arrows in FIG. 10, stabilizing bars 12 should also be provided there.

Figures 11, 12:
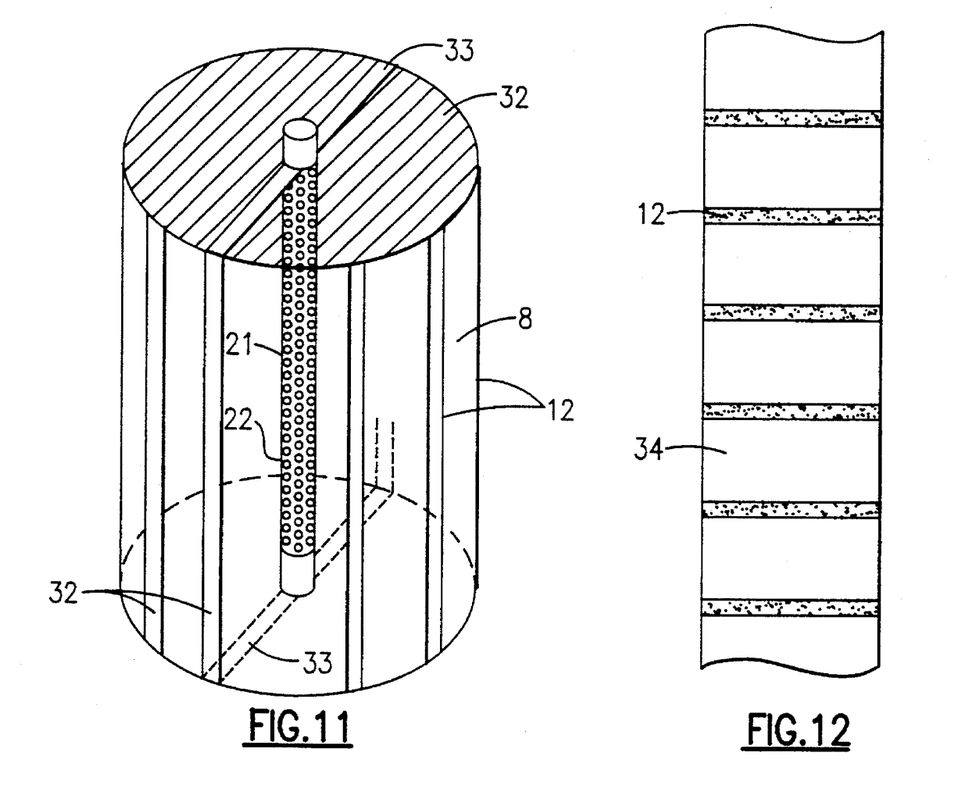
FIG. 11 a schematic representation of a further embodiment example of a filter packing according to the invention.
FIG. 12 shows a schematic representation of a paper web for winding a filter packing with stabilizing bars disposed perpendicular to the direction of the web.

FIG. 11 shows a filter packing 8 which can be used substantially as a radial filter element. This filter packing has a central core 21 with openings 22 within the filter packing. Core 21 is a hollow tube that remains open on one side, in this case on the top. The top of filter packing 8 is sealed, as indicated by the hatching, e.g. by an applied coating 32.

Along the lateral areas, stabilizing bars 12 are provided. These stabilizing bars can be fixed in position in the filter housing; it is also possible to connect stabilizing bars 12 with core 21 by additional braces 33. For reasons of clarity only one brace is shown here. These braces 33 can e.g. be bars glued or clamped to the top or underside of filter packing 8.

FIG. 12 shows a web 34 of a porous material, e.g. absorbent paper, from which filter packings 8 can be made, e.g. laminated or wound. This web of material 34 has spaced stabilizing bars 12. These stabilizing bars are e.g. enlargements of material or made of an additional, e.g. thin bar-shaped material, such as plastic, and connected with web of material 34. Stabilizing bars 12 extend perpendicular to the longitudinal direction of the web. When a filter packing is wound out of this web of material 34, it is stiffened in such a way that the filter packing remains dimensionally stable even at high flow pressures with low flow resistances.

All above-described filter packings can be used for filtering both liquid and gaseous media.

I claim:

1. A filter for filtering a medium comprising a filter housing with a medium inlet and a medium outlet, an inner surface of said filter housing comprising a stop formation, a porous filter packing, contained within said filter housing, formed of a rolled-up filter material made of a deformable material suitable for filtering the medium as the medium flows through said filter packing from said inlet to said outlet, said filter packing defining an entry surface through which the medium to be filtered enters said filter packing from said medium inlet, wherein a stabilization element extends parallel and adjacent to said entry surface, across a width the filter packing, and is interconnected with the filter packing across the entire width thereof, and thereby supports said filter packing within said filter housing, and opposed ends of said stabilization element are directly supported by the stop formation of the housing at fixed positions located on opposed sides of said entry surface, and said stabilization element facilitates placing said filter packing substantially only under tension, thereby maintaining a stable form of said filter packing when the medium to be filtered flows through said filter packing.

2. The filter according to claim 1, wherein said stabilizing element is embedded within said filter packing and protrudes out from said filter packing to abut against said stop formation of said filter housing.

3. The filter according to claim 1, wherein said filter packing is cylindrical in shape and defines a central axis, and said stabilizing element extends substantially perpendicular to the central axis.

4. A filter for filtering gaseous and liquid medium comprising a filter housing with a medium inlet, and a medium outlet and a porous filter packing, contained within said filter housing, made of a deformable material suitable for filtering the medium as the medium flows through said filter packing from said inlet to said outlet, said filter packing defining an entry surface through which the medium to be filtered enters said filter packing from said medium inlet, wherein a rigid hollow central core member extends through said filter packing and said filter packing locates said central core member at a fixed position within the filter housing, said core member is provided with a plurality of openings therein, and at least one end of the core member is open to facilitate the flow of medium through the plurality of openings and either in or out of the at least one open end of the core member to one of said inlet and said outlet, and a stabilization element extends adjacent and parallel to said entry surface, entirely across a width of said filter packing, and is attached to said filter packing, entirely across the width of said filter packing, a central portion of said stabilization element is attached to an end of said core member, said core member supports said stabilization element at a fixed location in said housing and adjacent to said entry surface, and said stabilization element supports said filter packing, thereby maintaining a stable form of said filter packing.

5. A filter according to claim 4, wherein said filter packing defines a cylindrical shape and said entry surface comprises an outer cylindrical surface of said filter packing.

6. The filter according to claim 5, wherein said stabilizing element is a bar penetrating through said filter packing.

7. The filter according to claim 4, wherein said entry surface comprises a planar surface and said filter packing consists of a plurality of layers of a porous sheet material and said stabilizing element interconnects all of said plurality of layers of a porous sheet material.

8. The filter according to claim 4, wherein said stabilizing element is embedded within said filter packing and protrudes out from said filter packing to abut against stop formations in said filter housing.

9. A filter for filtering gaseous and liquid medium comprising a filter housing with a medium inlet and a medium outlet, and a porous filter packing, contained within said filter housing, made of a deformable material suitable for filtering the medium as the medium flows through said filter packing from said inlet to said outlet, said filter packing defining an entry surface through which the medium to be filtered enters said filter packing from said medium inlet, wherein a stabilization element supports said filter packing adjacent said entry surface, said stabilization element extends parallel to said entry surface and is attached to the filter packing across the entire entry surface, and said stabilization element is supported by a stop formation formed on an inner surface of the housing at fixed positions located on opposed sides of said entry surface, and said stabilization element supports said filter packing and facilitates placing said filter packing substantially only under tension when the medium to be filtered flows through said filter packing, said entry surface is planar, said filter packing is cylindrical in shape and defines a central axis, and said stabilizing element extends substantially perpendicular to the central axis.

10. A filter for filtering gaseous and liquid medium comprising a filter housing with a medium inlet, and a medium outlet and a porous filter packing, contained within said filter housing, made of a deformable material suitable for filtering the medium as the medium flows through said filter packing from said inlet to said outlet, said filter packing defining an entry surface through which the medium to be filtered enters said filter packing from said medium inlet, wherein a rigid central core member is embedded in said filter packing and is located at a fixed position within the filter housing by said filter packing, a stabilization element extends adjacent and parallel to said entry surface, entirely across a width of said filter packing, and is attached to said filter packing, entirely across the width of said filter packing, a central portion of said stabilization element is attached to an end of said core member, said core member supports said stabilization element at a fixed location in said housing and adjacent to said entry surface, and said stabilization element supports said filter packing, thereby maintaining a stable form of said filter packing wherein said stabilization element is embedded within said filter packing and protrudes out from said filter packing to abut against stop formation on said filter housing.

11. The filter according to claim 10, wherein said core member is hollow and provided with a plurality of openings therein, and at least one end of the core member is open to facilitate the flow of medium through the plurality of openings and either in or out of the at least one open end of the core member to one of said inlet and said outlet.

12. The filter packing according to claim 10, wherein said stabilizing element is a bar.

13. The filter according to claim 12, wherein said filter packing is cylindrical in shape and defines a central axis, said stabilizing element extends substantially perpendicular to the central axis, and said core member extends coaxially along said central axis.

14. The filter packing according to claim 10, wherein said filter packing is a rolled-up mat of said deformable material and said stabilization element penetrates all layers of said roll-up mat.

* * * * *